US011482353B2

(12) United States Patent
Yamaguchi et al.

(10) Patent No.: US 11,482,353 B2
(45) Date of Patent: Oct. 25, 2022

(54) SUPERCONDUCTING CABLE AND INSTALLATION METHOD OF THE SAME

(71) Applicant: CHUBU UNIVERSITY EDUCATIONAL FOUNDATION, Kasugai (JP)

(72) Inventors: Sataro Yamaguchi, Kasugai (JP); Masae Kanda, Kasugai (JP); Takayuki Kojima, Tokyo (JP)

(73) Assignee: CHUBU UNIVERSITY EDUCATIONAL FOUNDATION, Kasugai (JP)

( * ) Notice: Subject to any disclaimer, the term of this patent is extended or adjusted under 35 U.S.C. 154(b) by 0 days.

(21) Appl. No.: 16/978,238

(22) PCT Filed: Mar. 6, 2019

(86) PCT No.: PCT/JP2019/008963
§ 371 (c)(1),
(2) Date: Sep. 4, 2020

(87) PCT Pub. No.: WO2019/172343
PCT Pub. Date: Sep. 12, 2019

(65) Prior Publication Data
US 2021/0005355 A1 Jan. 7, 2021

(30) Foreign Application Priority Data
Mar. 7, 2018 (JP) .............................. JP2018-041176
Mar. 6, 2019 (JP) .............................. JP2019-040589

(51) Int. Cl.
*H01B 12/00* (2006.01)
*H01B 12/08* (2006.01)
(Continued)

(52) U.S. Cl.
CPC ............. *H01B 12/08* (2013.01); *H01B 12/16* (2013.01); *H01R 4/68* (2013.01); *H02G 1/14* (2013.01)

(58) Field of Classification Search
CPC .......... H01B 12/08; H01B 12/16; H01R 4/68; H02G 1/14
See application file for complete search history.

(56) References Cited

U.S. PATENT DOCUMENTS 4,329,539 A * 5/1982 Tanaka .................. H01B 12/02
72/286
4,529,837 A * 7/1985 Borden ................. H01B 12/02
57/215
(Continued)

FOREIGN PATENT DOCUMENTS

JP 2001-035272 A 2/2001
JP 2009-224200 A 10/2009
(Continued)

OTHER PUBLICATIONS

WO 2014157084 cooling device for superconductive cable (Year: 2014).*
(Continued)

*Primary Examiner* — Pete T Lee
(74) *Attorney, Agent, or Firm* — Sughrue Mion, PLLC

(57) ABSTRACT

When bending a superconducting cable of a stack conductor structure in which a plurality of layers of tape wires are stacked, a twisting process is performed for the superconducting cable immediately before a bending portion of the superconducting cable.

16 Claims, 18 Drawing Sheets

(51) Int. Cl.
*H01B 12/16* (2006.01)
*H01R 4/68* (2006.01)
*H02G 1/14* (2006.01)

(56) References Cited

U.S. PATENT DOCUMENTS

| | | | |
|---|---|---|---|
| 8,600,465 B2 | 12/2013 | Matsushita | |
| 2002/0134574 A1* | 9/2002 | Hughey | H01B 12/16 505/231 |
| 2012/0214676 A1 | 8/2012 | Matsushita | |
| 2014/0243207 A1 | 8/2014 | Takayasu | |
| 2014/0302997 A1 | 10/2014 | Takayasu | |
| 2015/0024943 A1* | 1/2015 | Sugimoto | C22F 1/08 428/656 |

FOREIGN PATENT DOCUMENTS

| | | |
|---|---|---|
| WO | 2011/043376 A1 | 4/2011 |
| WO | 2014/157084 A1 | 10/2014 |

OTHER PUBLICATIONS

Berger, A.D., "Stability of Superconducting Cables with Twisted Stacked YBCO Coated Conductor", PSFC/RR-11-15, Feb. 2012, pp. 1-145, Plasma Science and Fusion Center, MIT.
Wilfried Goldacker et al., "Roebel cables from REBCO coated conductors: a one-century-old concept for the superconductivity of the future", pp. 1-45.
International Search Report of PCT/JP2019/008963 dated May 21, 2019 [PCT/ISA/210].
Communication dated Dec. 13, 2021 from the European Patent Office in EP Application No. 19764179.8.

* cited by examiner

STACKED CABLE
(SOLDERED AND
STACKED TAPE)

Cu SUPPORT
STRUCTURE(SECTION)

Fig. 3.7. Isomagnetic lines $H/H0 = 0.1, 0.2, \ldots,$
0.9 at the time $\kappa_0 t^2/(a2+4a2) = 0.08$ for a
rectangular conductor of sides $2a, a,$ during decay
of an initial field $H_0$ (from ref. 3.1).

Heinz Knoepfel, "Pulsed High Magnetic Fields",
North-Holland, 1970.

SUPERCONDUCTING CABLE AND INSTALLATION METHOD OF THE SAME

CROSS REFERENCE TO RELATED APPLICATIONS

This application is a National Stage of International Application No. PCT/JP2019/008963, filed Mar. 6, 2019, claiming priorities to Japanese Patent Application No. 2018-041176, filed Mar. 7, 2018 and Japanese Patent Application No. 2019-040589, filed Mar. 6, 2019, the contents of all of which are incorporated herein by reference in their entirety.

FIELD

The present invention relates to a superconducting cable and an installation method of the same.

BACKGROUND

FIG. 1A illustrates an outward appearance of a superconducting cable, and FIG. 1B illustrates a section of the superconducting cable. 10 to 30 number of tape wires for example are disposed to surround the section. This increases a current capacity of a superconducting cable 1. A DC power transmission system and an AC power transmission system each using a superconducting cable have been developed. A copper former 11 is used at a central portion of the superconducting cable 1. Hence, the weight of the superconducting cable 1 increases. Further, since use at high voltage is assumed, an electrically insulating layer 12 is thick, which increases a weight of the cable. Further, the high voltage is too high for an aircraft. Currently, this structure for power transmission is common for both an AC cable and a DC cable. With respect to a stacked superconducting cable as illustrated in FIG. 1A, in which a plurality of superconducting layers are concentrically made composite to provide concentric forward and backward current paths, reference may be made to Patent Literature 1, 2 or the like.

When a cable length is not long (e.g., within 200 m) at low voltage, a stack conductor is expected to be used. FIG. 2A is cited from FIG. 2.1 in Non Patent Literature 1. In the stack conductor whose section is as schematically illustrated in FIG. 2A, a plurality of layers of tape wires (of flat plates) are stacked (laminated) and soldered. Directions of current flowing through the plurality of tape wires are the same and are connected to a same electrode. Therefore, electrical insulation between tapes is not necessary. As described in Non Patent Literature 1, the stack conductor is twisted with certain pitches in a cable length direction. This enables bending of the stack conductor in any direction.

A time constant $\tau$ of a superconducting wire material is extremely long. Accordingly, the superconducting wire material behaves in the same manner as an alternating current during a period (from one to several hours) used by an aircraft. Specifically, when a conductor is composed of one metal block, and the conductor is composed of a plurality of assembled wires, current does not uniformly flow through a section of the conductor due to the skin effect if the current that flows through the conductor is in the same direction. FIG. 2B illustrates a contour diagram of a current density distribution (FIG. 2B is cited from FIG. 3.7 of Heinz Knoepfel, "Pulsed High Magnetic Fields", North-Holland, 1970. FIG. 3.7: Isomagnetic Jines $H/H_0$=0.1, 0.2, . . . , 0.9 at the time $k_0 t^2/(a2+4a2)$=0.08 for a rectangular conductor of sides 2a, a, during decay of an initial field $H_0$ (from ref. 3.1)). FIG. 2B is a contour diagram of a magnetic field distribution. This contour diagram substantially remains unchanged when a twisted wire is used for the conductor. Current that can be flown through a cable conductor in a superconducting state is greatly reduced. Further, when the cable conductor is twisted with a constant pitch, a tape wire material length at a central portion and a tape wire material length at each end portion differ. In manufacturing the cable conductor, the tape wire material lengths of the cable conductor are aligned. However, shrink lengths become different when the stack conductor is cooled to a low temperature. Hence, it is necessary to implement a structure for absorbing thermal contraction at a connection portion at which the cable conductor connects with a current lead having an end to be connected to a room temperature portion. Consequently, the structure of the cable conductor becomes complex.

When one tape wire material is twisted, a tensile stress is produced at an end portion. This tensile stress lowers the critical current. Hence, it is better to have twisted structures as few as possible. Airbus Company, for example, has developed a Roebel Conductor in order to make current that flows through superconducting tape wires uniform. FIG. 3 illustrates the shape of the Roebel Conductor (cited from FIG. 3 (FIG. 3. Schematic illustration of a Roebel bar made from coated conductor tapes. Two transversal cross-sections at different positions are also shown.) of Non Patent Literature 2: https://arxiv.org/ftp/arxiv/papers/1406/1406.4244.pdf). This conductor structure was invented in 1914, and the invention was made to cause current to flow uniformly in a section of a conductor of an AC generator, wherein the conductor has a large sectional area. The principle of this invention is to achieve uniform current distribution by transposing tape wires within each section of the conductor. The transposing is to change a section position of the conductor along a current flow direction and is configured as in FIG. 3 where colors are changed to make it easier to understand a situation in which the section position of the tape wire material is changed.

It is necessary to twist this conductor in consideration as well if this conductor is considered to be bent as a cable conductor. Superconducting tape wires, of which twisted structures with constant pitches are assumed over the entirety of a cable, are manufactured to have a constant width. In order to make these tape wires the Roebel Conductor, each tape wire material is cut to have a width that is substantially a half of the width of each superconducting tape wire material. FIG. 4 illustrates a situation state of the cut in the form of a photograph (cited from Figure. 8 (FIG. 8. Multi-stacking of strands: a 3-fold stack of punched CC tapes and 3 different Roebel cables with 4 mm width are shown. The upper cable consists of 14 single tapes, whereas the middle and the lower cables consist of 13 3-fold stacks and 5-fold stacks, respectively) of Non Patent Literature 2: https://arxiv.org/ftp/arxiv/papers/1406/1406.4244.pdf).

A width of the superconducting tape wire material narrows down. Hence, a critical current cut is reduced from critical current of the original superconducting tape wire material. Consequently, there is a problem that rated current of the cable is also lowered and further, processing cost is added.

It is necessary to set a cable length to be sufficiently long as compared with a pitch with which the wire material has been cut.

Further, currently, a problem occurs that a superconducting layer of the tape wire material peels off from a substrate due to a processing method of the cutting or the like. As illustrated in FIG. 4, since the superconducting tape wires are connected to a same electrode and the structure of the cable conductor becomes complex, electrical insulation between layers is not performed. Further, a Bi1123 wire material that is made in the metallurgical direction cannot be used for this structure.

A control system of an aircraft or the like, includes three systems that are hydraulic, pneumatic, and electric systems. Recently, the increasing electrification of functions on board aircraft (MEA: More Electric Aircraft) centering on an airframe has advanced in view of improvement in flight performance (mileage), maintainability, and safety. There is also a plan to install a superconducting system on the aircraft. The aircraft cannot be earthed, and a pneumatic pressure is low. Accordingly, a high voltage cannot be used. Therefore, a large-current low-voltage power supply becomes necessary and a new light-weight cable with a large current that replaces a copper cable is demanded, so that a study of application of a superconducting technology has been started.

PATENT LITERATURE 1: International Publication No. WO2011/043376

PATENT LITERATURE 2: Japanese Patent Kokai Publication No. JP-2001-35272A

NON PATENT LITERATURE 1: Berger, A. D., "Stability of Superconducting Cables with Twisted Stacked YBCO Coated Conductors", PSFC/RR-11-15, February 2012, Plasma Science and Fusion Center, MIT NON PATENT LITERATURE 2: Roebel cables from REBCO coated conductors: a one-century-old concept for the superconductivity of the future, Wilfried Goldacker, Francesco Grilli, Enric Pardo, Anna Kario, Sonja I. Schlachter, Michal Vojenciak <Searched by Internet on Feb. 1, 2018: URL: https://arvix.org/ftp/arxiv/papers/1406/1406.4244.pdf>

SUMMARY

An object of the present invention is to provide a method of facilitating bending and installing of a superconducting cable of a stack conductor structure in which a plurality of layers of tape wires are stacked. Another object of the present invention is to provide a conductor configured to cause each of alternating and direct currents uniformly flow through the tape wires without transpose of the tape wires and to further provide an apparatus configured to promote production of hydrogen gas by supplying heat from a power supply disposed on a room temperature side to a low temperature side through current leads as necessary when a refrigerant is liquid hydrogen.

Yet another object of the present invention is to provide a superconducting cable apparatus that is suitable for being mounted on a moving body such as an aircraft.

According to the present invention, there is provided a method comprising, performing a twisting process for a superconducting cable of a stacked structure in which a plurality of layers of tape wires are stacked, immediately before a bending portion of the superconducting cable, when bending the superconducting cable. There is also provided a method of achieving uniform current flow through tape wires without transposing the tape wires by a structure in which current lead wires connected to a room temperature portion are respectively connected to the tape wires, electrically insulated each other, and positive and negative polarities are mutually connected in a nested manner. In this method, thermoelectric semiconductors are introduced into current lead portions, and a Peltier effect of transporting heat from the room temperature portion to a low temperature portion by the current that flows the thermoelectric semiconductors is utilized.

According to the present invention, there is provided a superconducting cable including a stack conductor where a plurality of layers of tape wires are stacked, the superconducting cable being configured to be bent immediately before a portion of the superconducting cable to be bent when bending the superconducting cable. There is also provided a method of achieving uniform current flow through tape wires without transposing the wires by a structure in which current lead wires that are connected to a room temperature portion are respectively connected to the wires, electrically insulated each other, and positive and negative polarities are mutually connected in a nested manner. In this method, thermoelectric semiconductors are introduced into current lead portions, and the Peltier effect of transporting heat from the room temperature portion to a low temperature portion by the current that flows the thermoelectric semiconductors is utilized.

According to another aspect of the present invention, there is provided a superconducting cable apparatus, wherein at a connecting portion between tape wires and current leads having one ends connected to a power supply portion at a room temperature, the tape wires that are plural electrically insulated to one another, are disposed in parallel, and multiplexed. The superconducting cable apparatus may be configured to comprise a ferromagnetic member on both side surfaces of a cable of a stack conductor where a plurality of layers of tape wires are stacked, in a longitudinal direction of the cable of the stack conductor. The superconducting cable apparatus may be so configured that resistance values of the current leads at least end portions thereof are set to be different from resistance values of the other current leads.

According to another aspect of the present invention, there is provided a superconducting cable apparatus comprising: a thermally insulated double pipe including an inner pipe and an outer pipe with a space between the inner pipe and the outer pipe made vacuum sealed; a superconducting cable disposed in the inner pipe of the thermally insulated double pipe; and a refrigerant buffer configured to adjust an amount of a refrigerant to be supplied to the inner pipe of the thermally insulated double pipe, wherein the superconducting cable is configured to be kept in a state of being impregnated in the refrigerant in the inner pipe of the thermally insulated double pipe. The superconducting cable apparatus may be configured to comprise a controller configured to control a pressure in the refrigerant buffer tank to be applied to the refrigerant so that a liquid surface height of the refrigerant is kept constant.

According to the present invention, bending and installation of a superconducting cable of a stack conductor structure in which a plurality of layers of tape wires are stacked, or the like are facilitated.

According to the present invention, there can be provided a conductor by which each of alternating current and direct current is uniformly flown through the tape wires without transposing the tape wires. Uniform flowing of the current through the tape wires without transposing the wires is achieved by a structure in which current lead wires that are connected to a room temperature portion are respectively connected to the wires, electrically insulated each other, and positive and negative polarities are mutually connected in a nested manner.

According to the present invention, thermoelectric semiconductors are introduced into current lead portions, and the Peltier effect of transporting heat from the room temperature portion to a low temperature portion by the current that flows the thermoelectric semiconductors can be utilized.

According to the present invention, there can be provided a superconducting cable apparatus that is suitable for being mounted on a moving body such as an aircraft.

BRIEF DESCRIPTION OF DRAWINGS

FIG. 6 illustrates a structure in which liquid hydrogen is used as a refrigerant and hydrogen gas that has been obtained by evaporation of the liquid hydrogen is used for the fuel of a fuel cell.

FIG. 7 illustrates directions where a stack conductor is easy to bend and the stack conductor is difficult to bend, depending on the configuration of a stack conductor.

FIG. 10 illustrates a structure of a thermally insulated double pipe.

FIG. 11 is a schematic structure diagram of the thermally insulated double pipe.

FIG. 12 illustrates an example of a sectional configuration diagram of the thermally insulated double pipe.

DETAILED DESCRIPTION

Figure 1A:
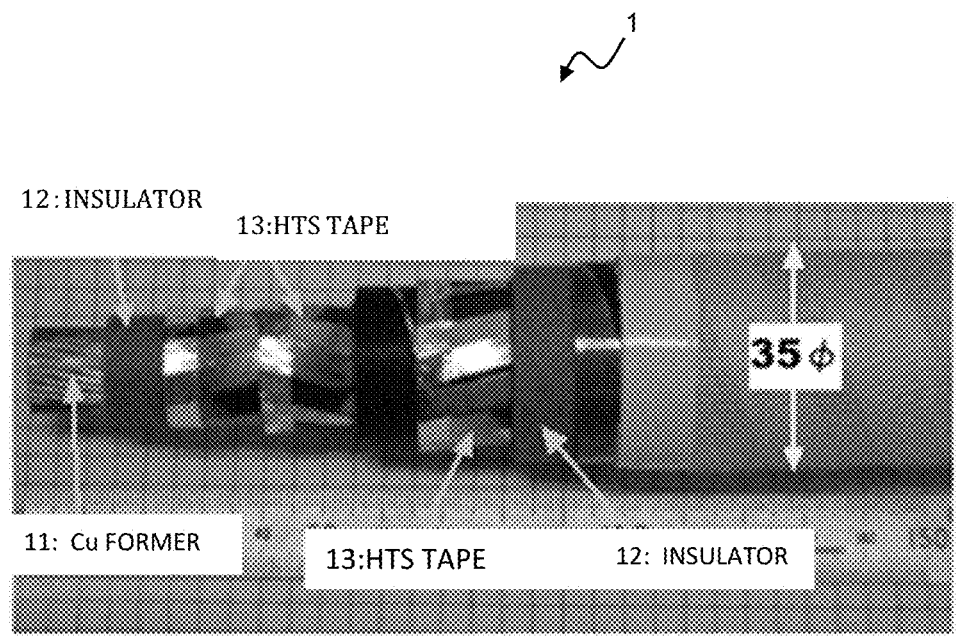
FIG. 1A and FIG. 1B that are diagrams illustrating a configuration of a common superconducting cable that is used for power transmission and distribution.
Figure 1B:
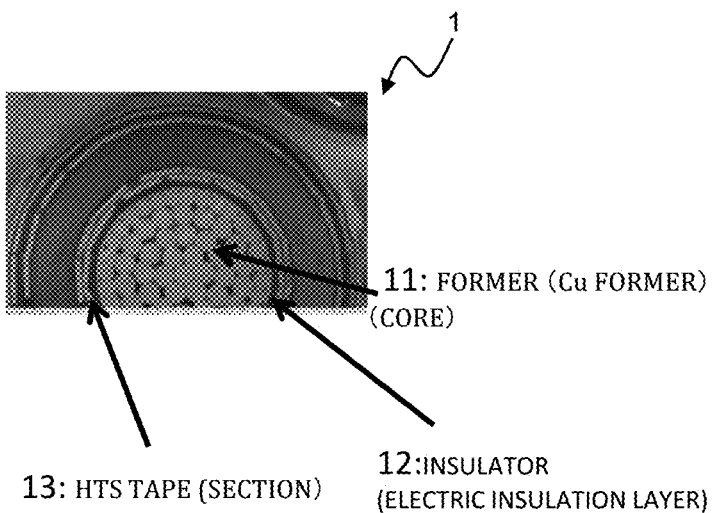
Figure 2A:
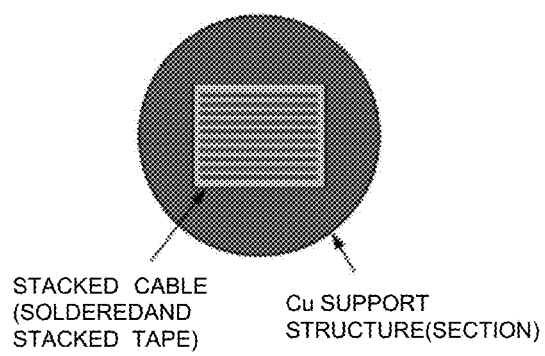
FIG. 2A is a diagram illustrating a configuration of a stack and illustrating the structure of a section.
Figure 2B:
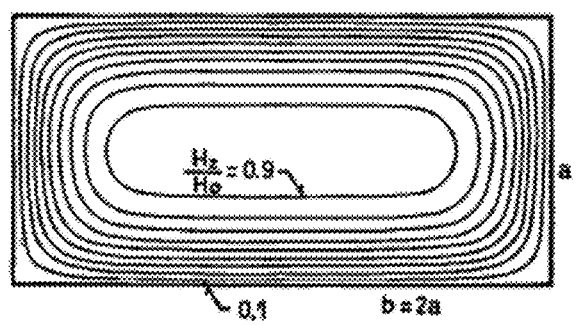
FIG. 2B is a diagram illustrating contour lines of a magnetic field distribution when current is flown through a stack conductor in a same direction.
Figure 3:
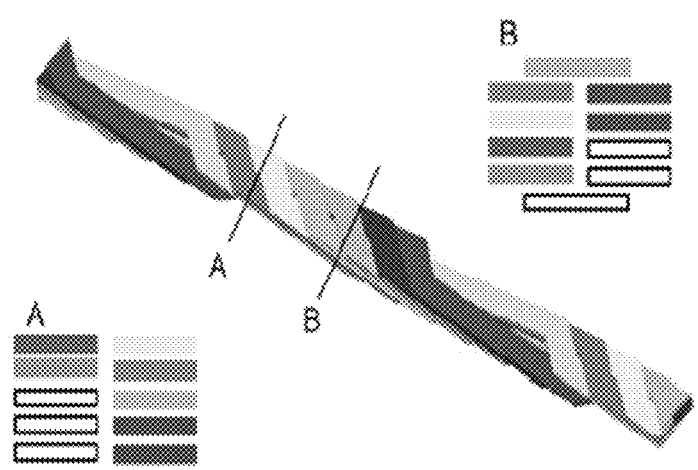
FIG. 3 is a diagram illustrating current that flows through superconducting tape wires.
Figure 4:
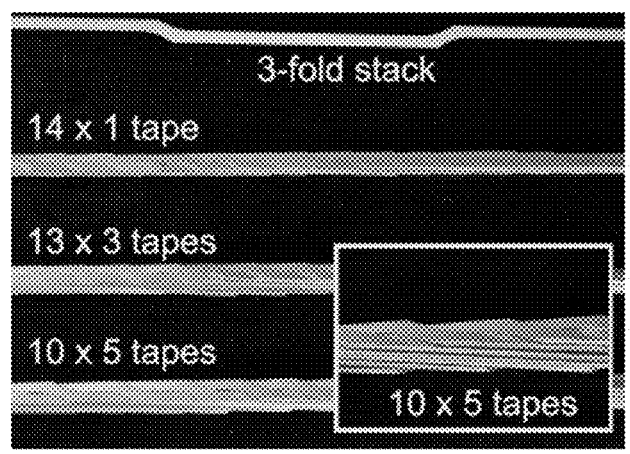
FIG. 4 is a diagram illustrating superconducting tape wires of a stack conductor.
Figure 5:
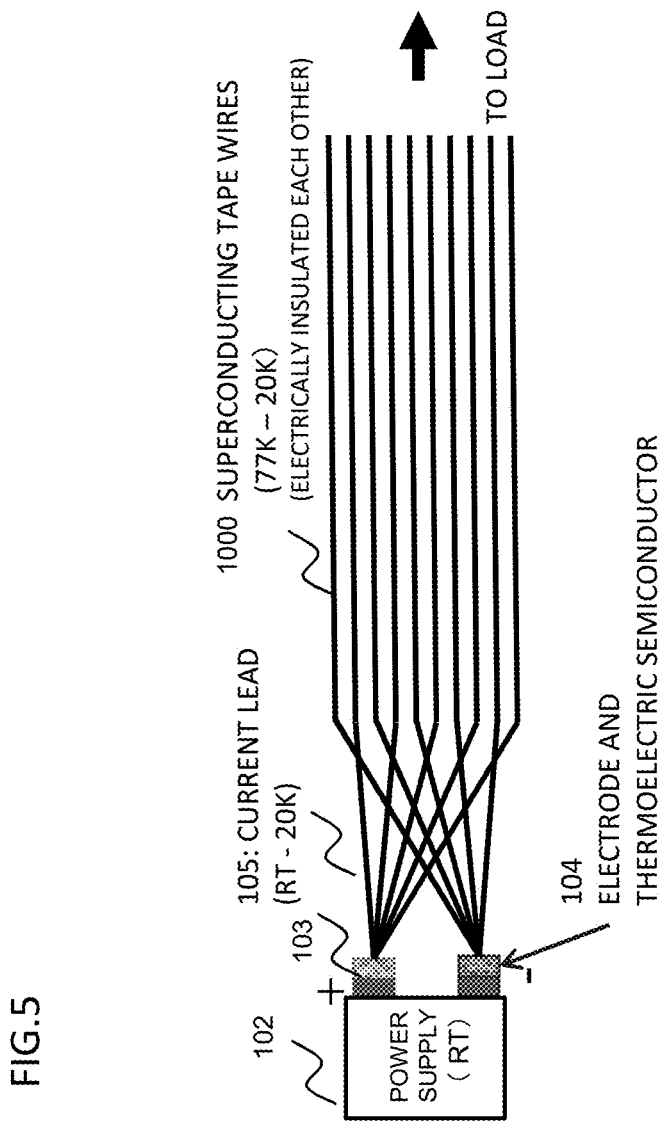
FIG. 5 is a diagram illustrating an example embodiment.

Example embodiment of the present invention will be described. FIG. 5 is a diagram illustrating the example embodiment, wherein a method of connection between superconducting tape wires and current lead wires that have been electrically insulated is illustrated. In order to cause current to flow in opposite directions through stacked superconducting tape wires (HTS (high-temperature superconductor) tape wires) 100 respectively, the superconducting tape wires 100 are alternately connected to two electrodes 103 and 104 of a power supply 102 via current leads 105, respectively. Therefore, the respective superconducting tape wires 100 and the respective strands of the current leads 105 that are connected to the superconducting tape wires 100 are electrically insulated. While the power supply 102 provides a dc current output in FIG. 5, the connection in the case of an ac power supply is made in the same manner (in this case, however, a thermoelectric semiconductor may be excluded from each of the electrodes 103 and 104). FIG. 5 illustrates connection between the power supply 102 and the superconducting tape wires 100 that compose a superconducting cable. When the current leads are connected to a load which is operated at a room temperature, a structure of connection between the current leads 105 and electrodes of the load may be set to be similar to the connection structure between the power supply 102 and the current leads 105. The arrangement as mentioned above causes uniform current to flow through the superconducting tape wires, even when direct current is flown and when alternating current is flown. The superconducting cable may also be configured as a superconducting cable of a stack conductor where a plurality of layers of the superconducting tape wires 100 are stacked. The power supply may be an ac power supply. A plurality of power supplies with a frequency higher than a commercial power supply frequency are currently mounted on an aircraft that uses much power. In the ac power supply, since the thermoelectric semiconductor does not necessarily conduct heat to a low temperature side, the thermoelectric semiconductor may be removed.

In FIG. 5, the thermoelectric semiconductor (Peltier element) is attached to each of the electrode 103 and 104 of the power supply 102 that is disposed at a room temperature, and is connected to the copper wires of the current leads 105. When the superconducting cable is cooled by liquid hydrogen, a P-type thermoelectric semiconductor is connected to the electrode 103 on the positive side of the power supply 102, and an N-type thermoelectric semiconductor is attached to the electrode 104 on the negative side of the power supply 102. This causes heat to be transported from a room temperature side to a low temperature side, thereby enabling increase of generation of hydrogen gas.

When the superconducting cable is cooled by liquid nitrogen, the polarity of each thermoelectric semiconductor is reversed from a case where the superconducting cable is cooled by the liquid hydrogen. Thus, the N-type thermoelectric semiconductor is attached to the electrode 103 on the positive side of the power supply, and the P-type thermoelectric semiconductor is attached to the electrode 104 on the negative side of the power supply. This reduces transportation of heat (heat intrusion) to the low temperature side, thereby enabling to hold liquid nitrogen for a long period of time.

A fuel cell (FC) takes in air from an outside to ensure oxygen of the fuel cell. Though the fuel cell provides a dc current output, the fuel cell is connected to a terminal through a power converter when a change of a power supply voltage or an ac power supply is needed. Further, an operation with a constant output is widely used. Therefore, a secondary battery is often used to adjust an output. Accordingly, the power supply 102 is composed of the FC, the power converter, the secondary battery, and so on. In this case, since a semiconductor device that is used for the power converter produces heat, it is so configured that cooling is performed using a generated refrigerant gas.

Figure 6:
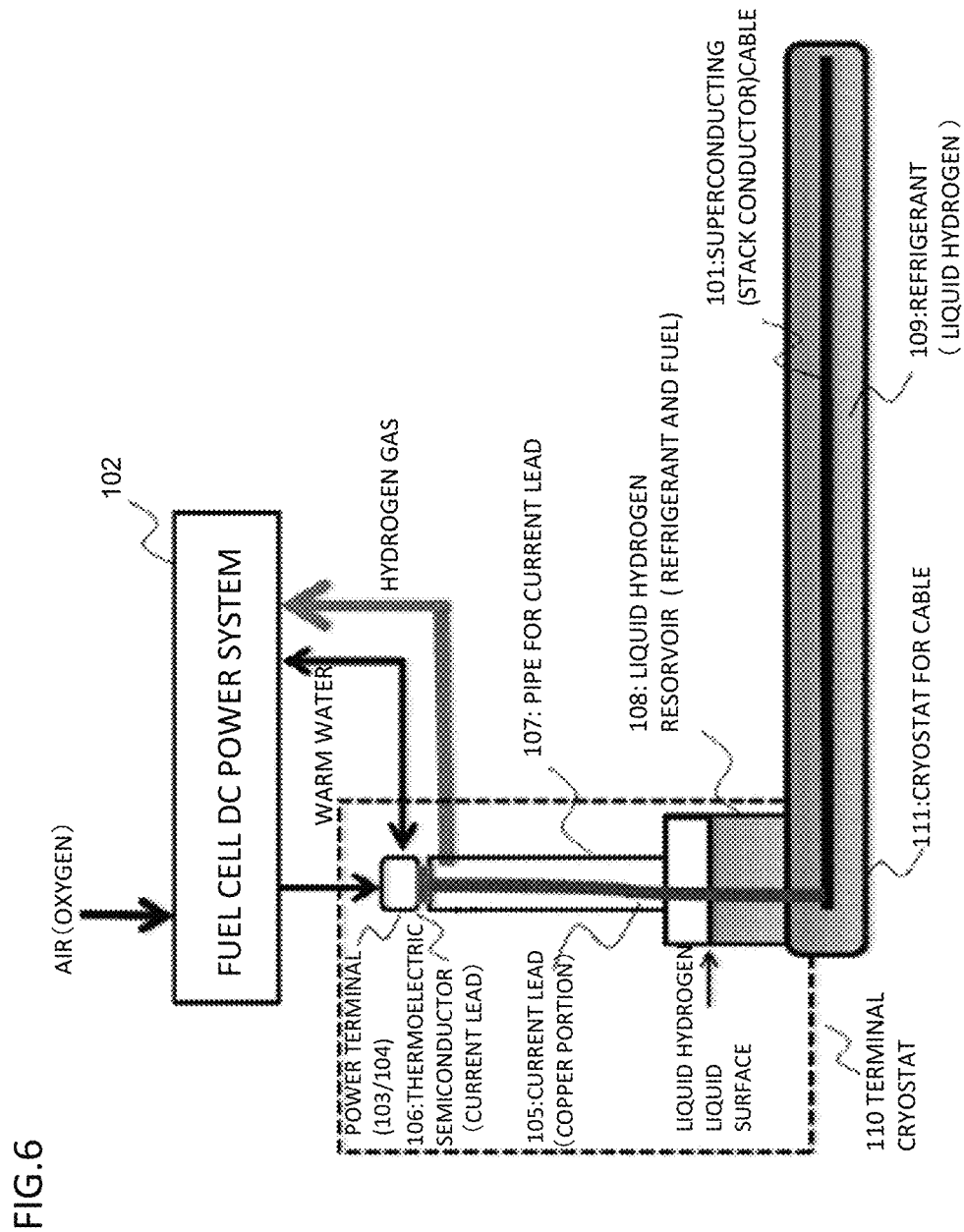
FIG. 6 is a diagram illustrating the example embodiment.

FIG. 6 is a diagram illustrating a configuration example in which a superconducting (stack conductor) cable 101 is cooled using liquid hydrogen as a refrigerant. The superconducting (stack conductor) cable 101 is configured as the superconducting cable of the stack conductor in FIG. 5, in which the plurality of layers of the superconducting tape wires 100 are stacked. The superconducting (stack conductor) cable 101 is disposed in a terminal cryostat 110 and liquid hydrogen 109 (refrigerant) is filled in inside the terminal cryostat 110. A liquid hydrogen reservoir 108 is mounted over a cable cryostat 111. The superconducting (stack conductor) cable 101 is impregnated in the liquid hydrogen (refrigerant) 109. However, in acceleration or deceleration of an aircraft, the refrigerant moves to one side. Thus, a portion of a pipe 107 for the current leads, to which the gas obtained by gasification moves from the liquid hydrogen reservoir 108, is set to have a structure in which a plurality of pipes with narrow sections are arranged in parallel.

It may be so configured that an electric heater (not illustrated) is installed in the liquid hydrogen reservoir 108 and the electric heater is powered on as necessary to adjust a generation amount of the hydrogen gas. A pipe (not illustrated) configured to enable supply of the liquid hydrogen not illustrated from a tank and a flow controller (not illustrated) are also installed in the liquid hydrogen reservoir 108.

The current leads 105 (copper portion) and a portion of thermoelectric semiconductors 106 are provided in a path configured to connect the superconducting (stack conductor) cable 101 to the power supply terminals (electrodes) 103/104. The current leads 105 (copper portion) are inserted through the liquid hydrogen reservoir 108. Heat is introduced into the liquid hydrogen reservoir 108 via the current leads 105. Since heat is entered from a room temperature portion of the current leads 105, the liquid hydrogen is gasified, and the hydrogen gas comes out from an upper portion of the current leads 105. This causes the hydrogen gas to be finally introduced to the fuel cell 102 after the temperature of the hydrogen gas has been raised to the room temperature or higher.

Power from the fuel cell (fuel cell direct current power supply system (power supply)) 102 is connected to the current leads 105 through the power supply terminals (electrodes) 103/104. Since the power supply terminals (electrodes) 103/104 are cooled by the hydrogen gas at a low temperature, the power supply terminals 103/104 are heated by heat from the fuel cell 102. In the example in FIG. 6, warm water is introduced from the fuel cell (fuel cell direct current power supply system) 102. A surface of each of the power supply terminals (electrodes) 103/104 takes electrical insulation and thermal insulation with respect to an outside. In a case where the refrigerant is liquid nitrogen, nitrogen gas is discharged to the outside, and a power supply other than the fuel cell is used. In this case, in order to avoid entry of heat into the low temperature side, Peltier elements are disposed to transport Peltier heat from the low temperature side to the room temperature side.

Figure 7:
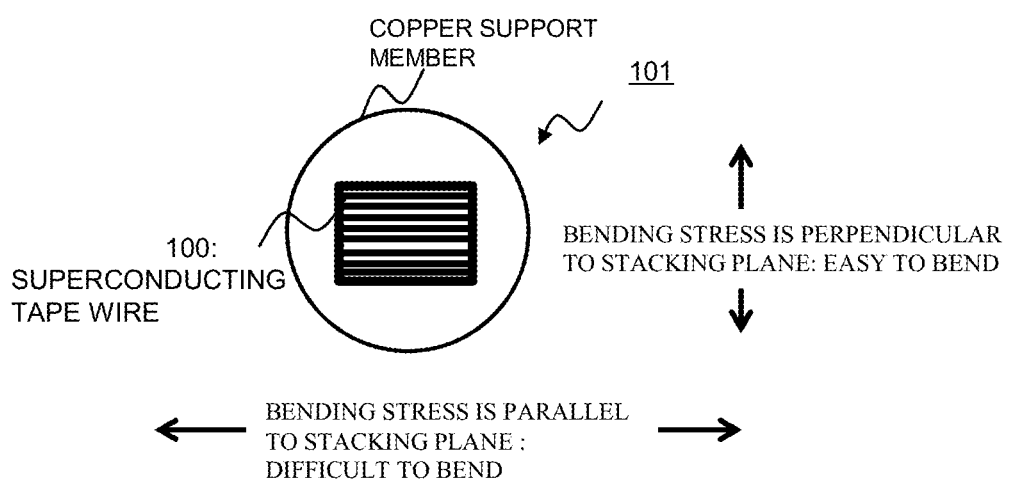
FIG. 7 is a diagram illustrating the example embodiment.

When the superconducting (stack conductor) cable 101 is to be bent, there are a direction where the superconducting (stack conductor) cable 101 is easy to bend and a direction where the superconducting (stack conductor) cable 101 is difficult to bend, which is illustrated in FIG. 7. The superconducting (stack conductor) cable 101 of the stack conductor where a plurality of layers of the superconducting tape wires are stacked has anisotropy with respect to a direction of easiness for bending. That is, when a bending stress (loading direction) is parallel to a stacking plane, the cable is difficult to bend. When the bending stress (loading direction) is perpendicular to the stacking plane, the cable is easy to bend.

Non Patent Literature 1 proposes a stack conductor configured to be bent in any direction by twisting the stack conductor constantly with same pitches, as well.

However, when such a structure is used, lengths of the tape wires at a central portion and an end portion of the stack conductor become different.

Even when the stack conductor is manufactured where the lengths of the tape wires are made uniform at room temperature, shrink lengths become different when the stack conductor is cooled to a low temperature. Thus, the length of the stack conductor at the end portion becomes different.

Further, a tensile stress is produced at the end portion of the tape wire due to the twisting. A lot of these report that the tensile stress reduces critical current.

Therefore, the twisting should be avoided as much as possible if there is no need for the twisting.

In view of the above-mentioned problems, in the example embodiment, only when bending the superconducting (stack conductor) cable, the stack conductor is twisted in a direction where the superconducting (stack conductor) cable would become easy to bend, before bending of the stack conductor.

The superconducting (stack conductor) cable may be bent a plurality of times. On that occasion, it is so arranged that the superconducting (stack conductor) cable is twisted in a direction opposite to a twisting direction of a last time, so that length differences do not pile up.

This arrangement makes a great difference (advantage) over the configuration of Non Patent Literature 1 where the stack conductor is twisted in a same direction with a constant pitch, in terms of conductor performance. If the bending is in a same plane, the stack conductor is easy to bend in both of right and left directions so that there is no need for twisting.

The following describes a structure and a procedure. A bellows portion (bellows pipe) is used for a bending portion of a thermally insulated double pipe and a straight pipe is used for a straight line portion of the thermally insulated double pipe. Therefore, the bending portion can be bent in any direction.

Figure 8A:
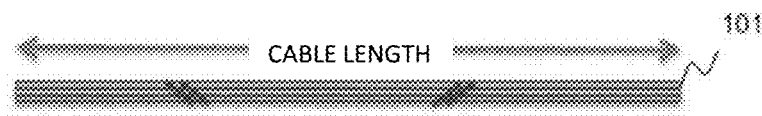
FIG. 8A, FIG. 8B, and FIG. 8C are diagrams illustrating the example embodiment.

As illustrated in FIG. 8A, the superconducting (stack conductor) cable 101 having only a necessary length is manufactured. The necessary length for use in an aircraft is conceived to be about 200 m at most.

Figure 8B:
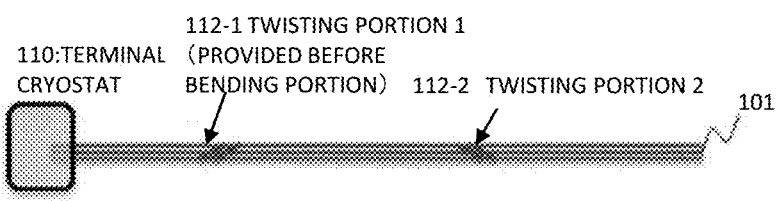

Then, as illustrated in FIG. 8B, when the superconducting (stack conductor) cable 101 is bent in a direction where the superconducting (stack conductor) cable is difficult to bend, the superconducting (stack conductor) cable 101 is processed to be twisted by 90 degrees at a portion immediately before a portion to be bent. As described above, a direction of the twisting is not the same and is reversed each time the twisting is performed. This makes lengths of the tape wires that compose the superconducting (stack conductor) cable 101 uniform as much as possible. The superconducting (stack conductor) cable 101 is completed as mentioned above.

Referring to FIG. 8B, the superconducting (stack conductor) cable 101 is in a straight line shape. When the superconducting (stack conductor) cable 101 is routed within a same plane, the superconducting (stack conductor) cable 101 is connected to the terminal cryostat 110 so that there is no need for twisting because the superconducting (stack conductor) cable 101 is to be bent right and left within the same plane. That is, the superconducting (stack conductor)

cable 101 is so disposed that a direction perpendicular to a surface where the superconducting tape wires of the superconducting (stack conductor) cable 101 have been stacked corresponds to the right and left of the same plane and is then connected to the terminal cryostat 110.

Figure 8C:
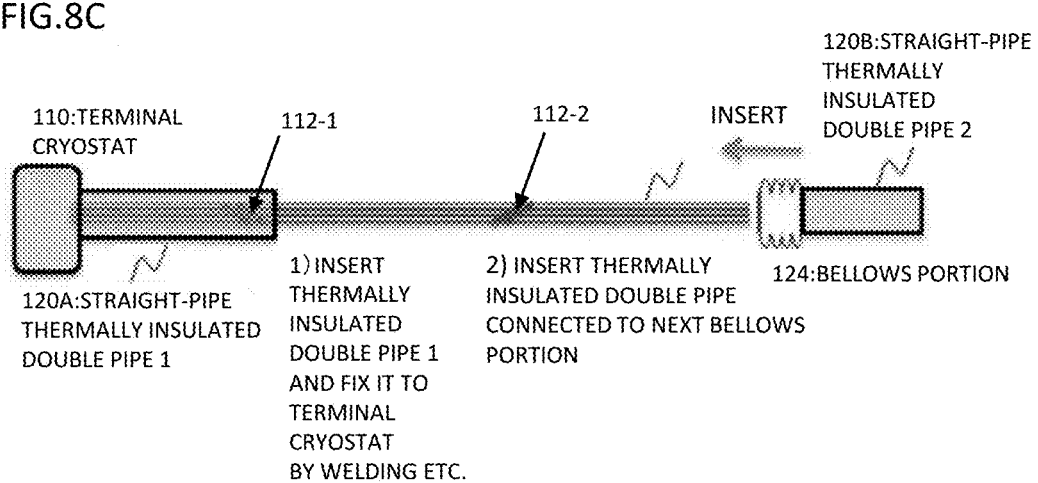

As illustrated in FIG. 8C, the superconducting (stack conductor) cable 101 in the straight line shape is inserted into the terminal cryostat 110, thereby fixing the superconducting (stack conductor) cable 101. Then, connection to the current leads (copper portion) 105 is made, as necessary.

As illustrated in FIG. 8C, a straight-pipe thermally insulated double pipe 1 (120A) is fixed to the terminal cryostat 110 by welding or the like. Then, a thermally insulated double pipe, in which a bellows portion (bellows pipe) 124 and a straight-pipe thermally insulated double pipe 2 (120B) are connected, is inserted. The bellows portion (bellows pipe) 124 is disposed at the bending portion (portion where the cable is difficult to bend). The superconducting (stack conductor) cable 101 in the straight line shape is twisted at a twisting portion (e.g., 112-1) before the bending portion so that the superconducting (stack conductor) cable 101 is easy to bend at the bending portion (portion where the cable is difficult to bend) in a bending direction.

By twisting the superconducting (stack conductor) cable 101 at the twisting portion 112-1 by 90 degrees, for example, the easy bending direction which was right and left in the same plane (in-plane directions), after the twisting, becomes perpendicular to the said plane.

Figure 9A:
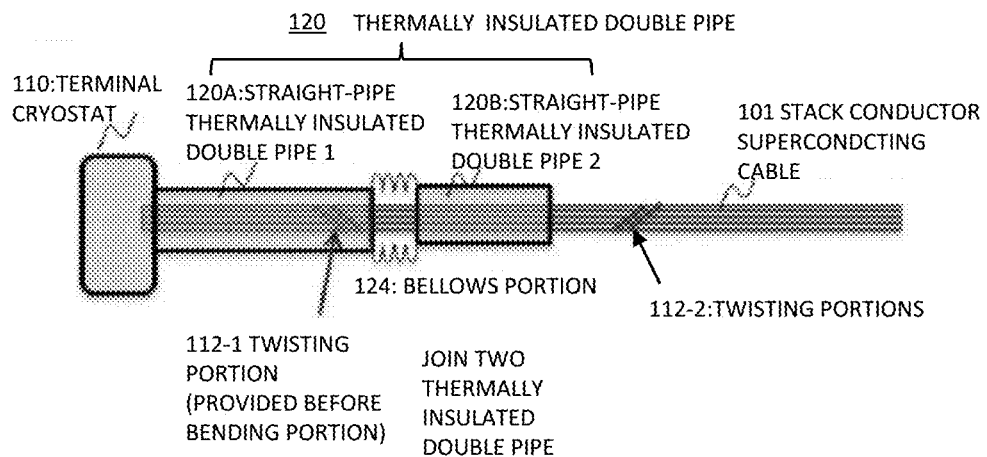
FIG. 9A and FIG. 9B that are diagrams illustrating the example embodiment.

As illustrated in FIG. 9A, the bellows portion 124 between the straight-pipe thermally insulated double pipe 1 (120A) and the subsequent straight-pipe thermally insulated double pipe 2 (120B) is joined by welding or the like. The inner pipe (not illustrated) of the thermally double-pipe 120 is fixed to the outer pipe through a heat insulating material (not illustrated). A jig configured to support a force in the bending direction of the superconducting (stack conductor) cable 101 is present in the inner pipe (not illustrated) of each thermally insulated double pipe 120.

Figure 9B:
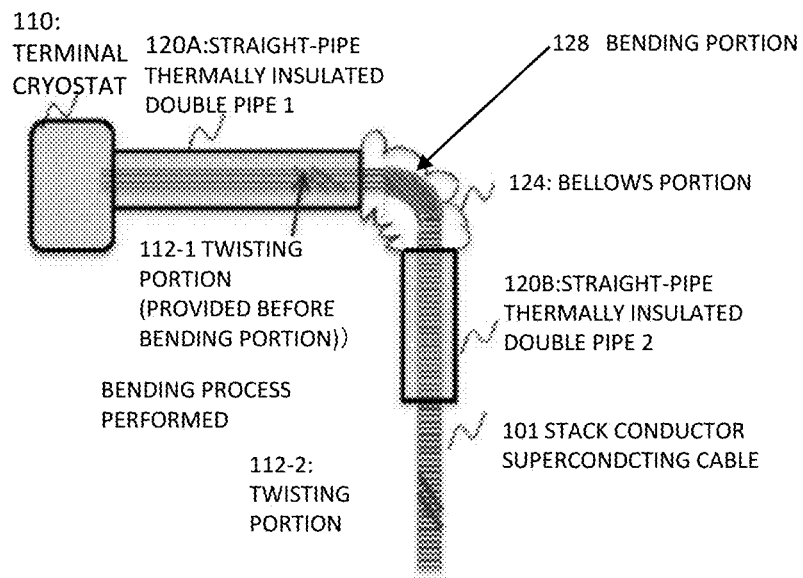

As illustrated in FIG. 9B, the thermally insulated double pipes 120 (including the straight-pipe thermally insulated double pipe 1 (120A), the bellows portion 124, and the straight-pipe thermally insulated double pipe 2 (120B)) and the superconducting (stack conductor) cable 101 are bent together by jigs that are fixed.

Processes from FIG. 8C to FIG. 9B are repeated to insert the superconducting (stack conductor) cable 101 into the thermally insulated double pipes 120. Finally, another terminal cryostat (not illustrated) is attached.

Figure 10:
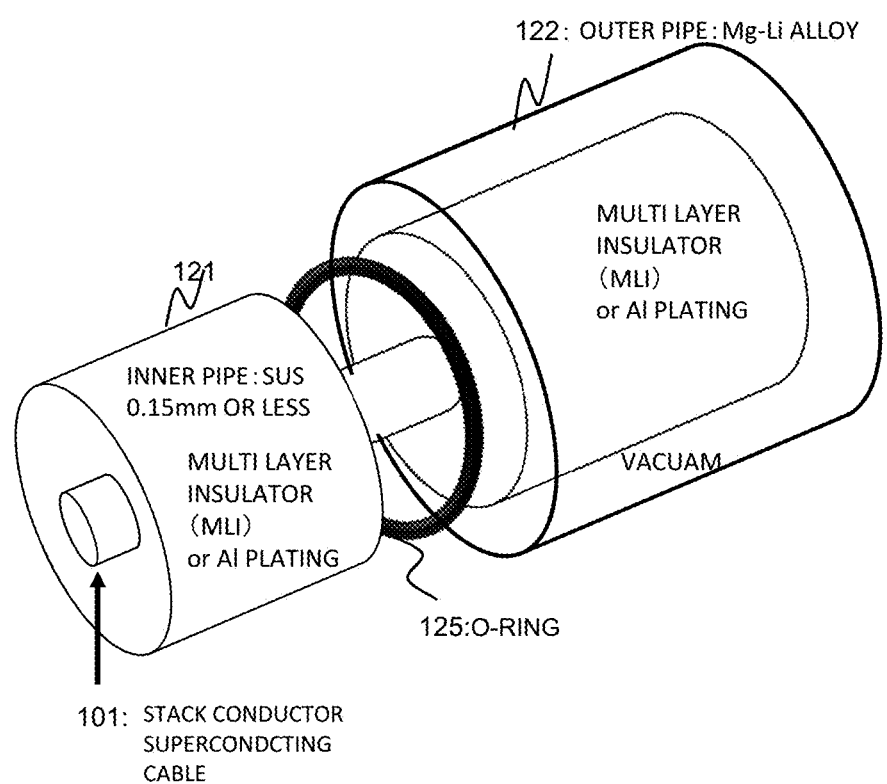
FIG. 10 is a diagram illustrating the example embodiment.

As schematically illustrated in FIG. 10, each thermally insulated double pipe 120 includes an inner pipe 121 and an outer pipe 122 that are coaxially disposed. Then, the thermally insulated double pipe 120 is so structured that the inner pipe 121 is supported from the outer pipe 122. Space between the outer pipe 122 and the inner pipe 121 is evacuated to vacuum.

A magnesium-lithium (Mg—Li) alloy, for example, may be used for the outer pipe 122 in order to make the thermally insulated double pipe 120 light-weight for an aircraft. A stainless pipe or a lithium-magnesium alloy with a thickness of 0.15 mm or less, for example, may be used for the inner pipe 121. Since an expansion force acts on the inner pipe, a thin stainless pipe can be used. Further, since a compression force acts on the outer pipe, the outer pipe is forced to be thick in order to avoid buckling. Thus, it is necessary to use a material with a low density.

When the diameter of the outer pipe 122 is 50 Φ or less, aluminum plating may be applied to the outside of the inner pipe 121.

Aluminum plating or zinc plating may be applied to the inside of the outer pipe 122. The arrangement as mentioned above reduces an amount of heat intrusion to a low temperature system. When the amount of the heat intrusion in the thermally insulated double pipe 120 increases, the outside of the outer pipe 122 is frosted. Therefore, a safety measure is taken.

Figure 11:
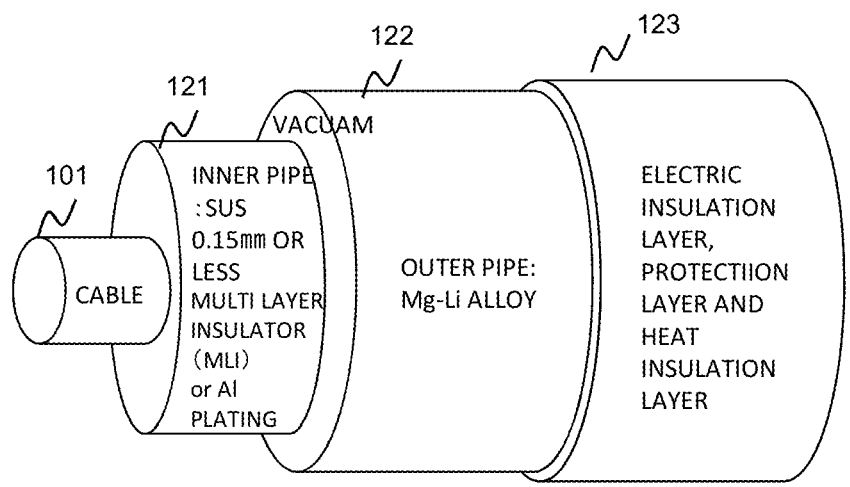
FIG. 11 is a diagram illustrating the example embodiment.

As illustrated in FIG. 11, for example, an outer surface of the outer pipe 122 may be covered with an electric insulation layer 123 with a low thermal conductivity, for example.

The electric insulation layer 123 is made up of Teflon®, epoxy resin, nylon, aramid resin, or the like, for example.

When the stainless pipe is used for the inner pipe 121, thin welding is difficult. Hence, the welding is performed via a stainless ring 125. Since the outer pipe 122 is a room temperature portion, the outer pipe 122 is joined or welded, using a metal O-ring or an O-ring made of Viton (where fluoro-rubber is a fluorinated hydrocarbon polymer)(Viton O-ring) or the like.

Figure 12:
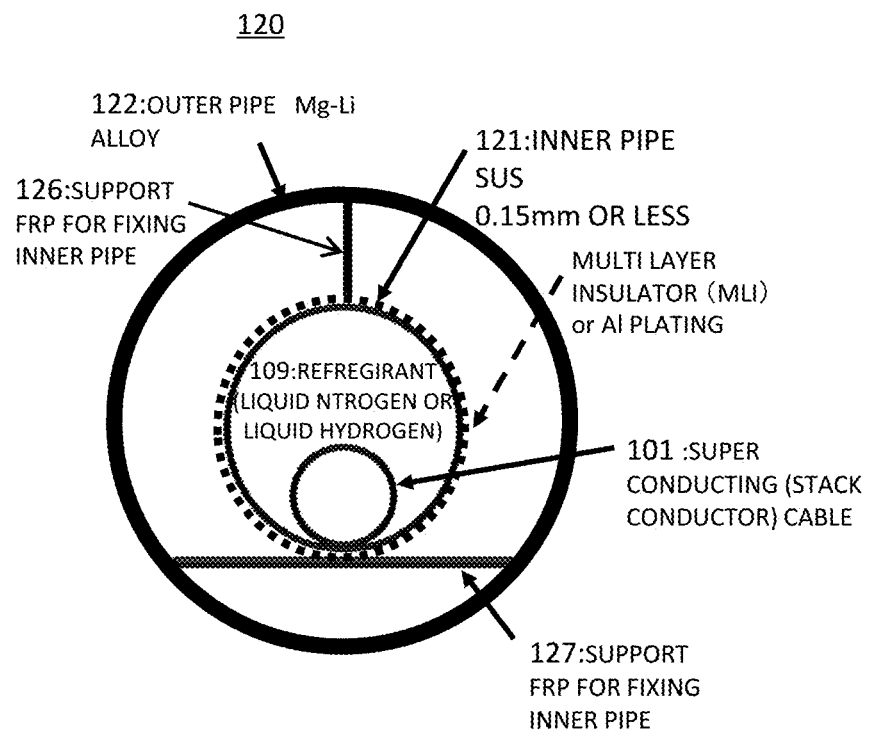
FIG. 12 is a diagram illustrating the example embodiment.

FIG. 12 is a diagram schematically illustrating sections of the thermally insulated double pipe 120 and the superconducting (stack conductor) cable 101. The inner pipe 121 is composed of a material with a low thermal conductivity such as FRP (Fiber-Reinforced Plastics). Reference numerals 126 and 127 indicate support members (composed of FRP or the like) for fixing the inner pipe 121 to the outer pipe 122. A large force is produced when the speed of the aircraft is accelerated or decelerated. Then, supports in consideration of strength are mounted as a measure against the large force. The surface of the inner pipe 121 is covered with aluminum plating or a multi-layer insulation (layer), for thermal insulation. The superconducting (stack conductor) cable 101 is cooled by the refrigerant 109 (the liquid nitrogen or the liquid hydrogen). Vacuum evacuation is performed from the terminal cryostat 110 (see FIG. 6 and so on).

Figure 13:
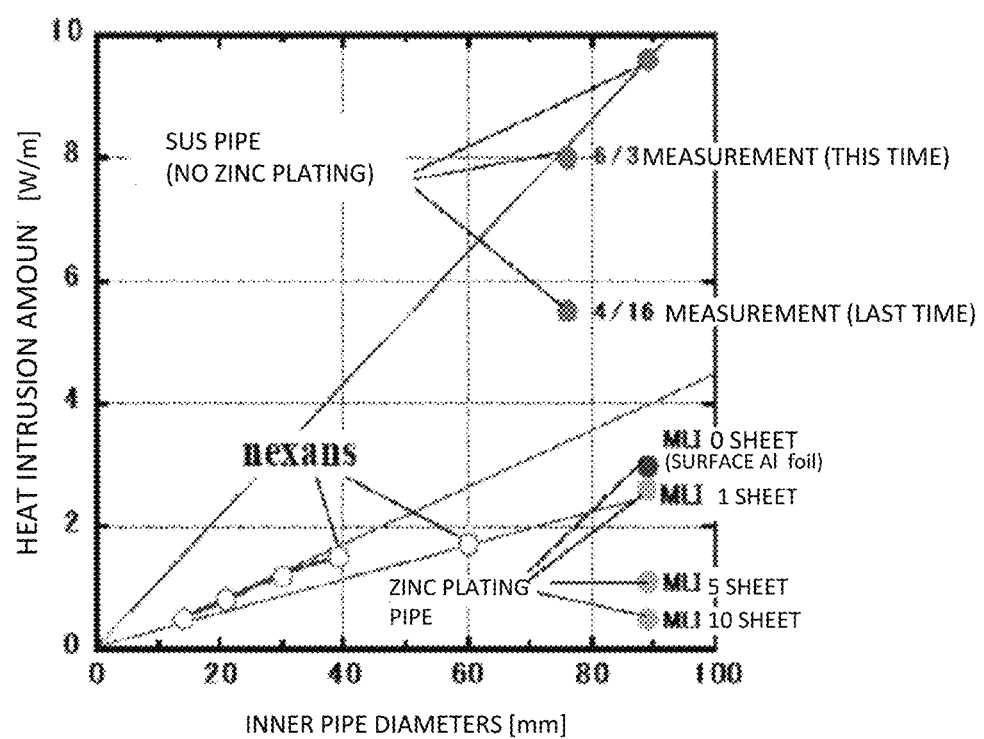
FIG. 13 is a diagram illustrating the example embodiment.

FIG. 13 illustrates results of measurements of heat intrusion amounts of a thermally insulated double pipe at Chubu University under various conditions. FIG. 13 illustrates experimental data obtained by development at Chubu University that has been made so far and at the same time illustrates relationships between the heat intrusion amounts and inner pipe diameters of the thermally insulated double pipe which has been commercially available. A horizontal axis indicates a diameter of the inner pipe 121, while a vertical axis indicates the heat intrusion amount (heat amount Watt per meter). Data is plotted from the catalog of the Nexans company.

Since the temperature of the inner pipe 121 is low, the heat intrusion amount tends to increase when a diameter of the inner pipe 121 is large. It can be seen that when the inner pipe 121 is covered with an aluminum plating and a multi-layer insulation, the heat intrusion amount is remarkably reduced more than that in the case of the inner pipe 121 with a stainless surface.

Figure 14:
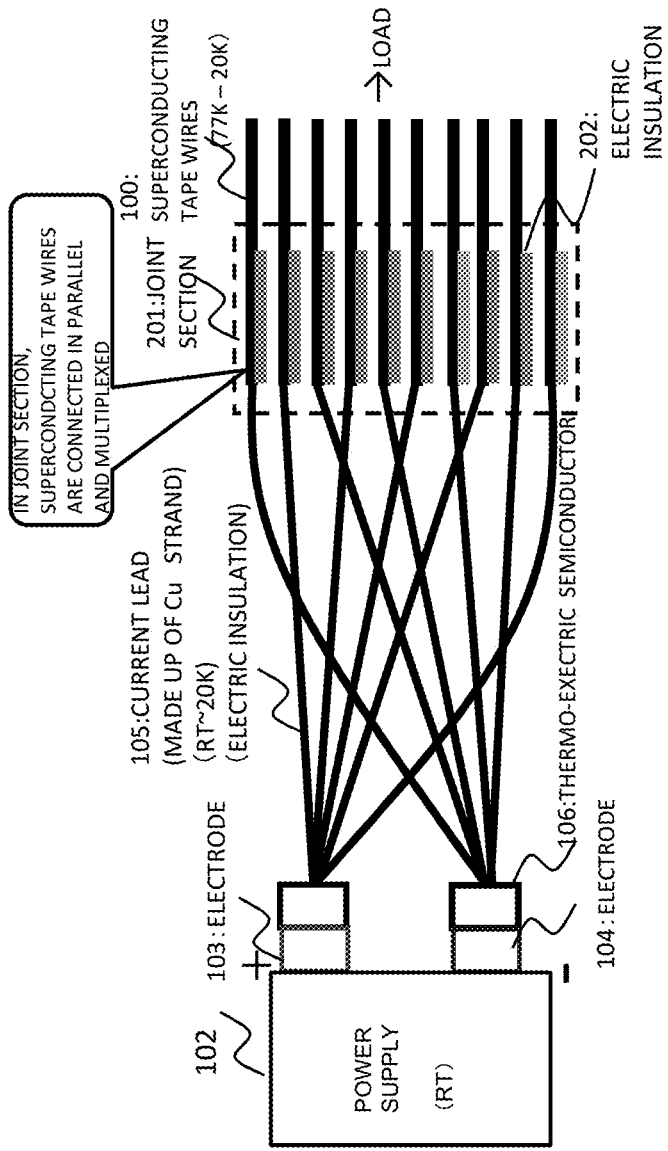
FIG. 14 is a diagram illustrating a variation example of the example embodiment (in FIG. 5).

In the example embodiment of the present invention, the superconducting tape wires 100 may be multiplexed at each connecting portion between the superconducting tape wires 100 and the current lead 105. FIG. 14 is a diagram illustrating the example embodiment of the present invention.

FIG. 14 illustrates a variation example of FIG. 5 described above. A plural superconducting tape wires 100 are disposed side by side (and in parallel) and are multiplexed at a connecting portion 201 between the superconducting tape wires 100 and the current leads 105. The superconducting tape wires 100 are electrically insulated by electric insulating members 202 to one another at the connecting portion 201. The superconducting tape wires 100 that are connected to the positive electrode 103 via the current leads 105 and the superconducting tape wires 100 that are connected to the negative electrode 104 via the current leads 105 are alternately disposed. In the arrangement in FIG. 14 where the plural superconducting tape wires 100 are disposed side by side and multiplexed, the plural superconducting tape wires 100 may be stacked, as will be described below.

Figure 15:
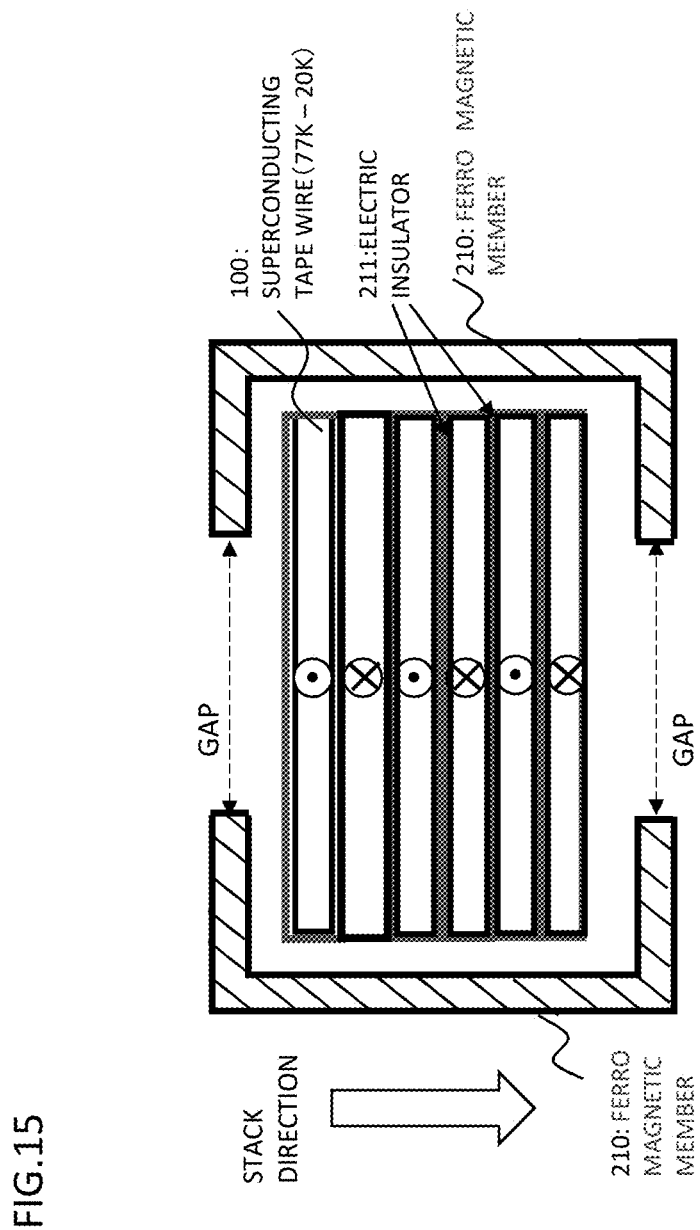
FIG. 15 is a diagram illustrating a variation example of the example embodiment.

FIG. 15 is a diagram for illustrating another variation example of the example embodiment of the present invention. As schematically illustrated in FIG. 15, a ferromagnetic member 210 may be disposed on both side surfaces of the cable of the stack conductor to enclose the both side surfaces. That is, the ferromagnetic member 210 (such as a soft ferromagnetic member or a carbon steel plate) is disposed on the side surface of each side of the cable of the stack conductor (superconducting cable 101) along a longitudinal direction of the cable of the stack conductor (superconducting cable 101) where a plurality of layers of the superconducting tape wires 100 have been stacked.

The ferromagnetic member 210 may have a tube structure in which each section of the ferromagnetic member 210 is a rectangular and hollow. In this case, it may be so configured that, along the longitudinal direction, an opening is provided in a part of the central portion of each of upper and bottom surfaces of the ferromagnetic member 210 respectively opposed to upper and lower ends of the cable of the stack conductor in a stacking direction, so that, as illustrated in FIG. 15 as a sectional shape, the sectional shape of the ferromagnetic member 210 has gaps (opening portions) sandwiching the cable of the stack conductor, thereby suppressing reduction of a magnetic field. Alternatively, it may be so configured that a pair of ferromagnetic members each having a U-shaped sectional shape and being extended in the longitudinal direction enclose the side surfaces of the superconductor cable of the stack conductor (superconducting cable 101) from both sides, and longitudinal opposed sides of the pair of ferromagnetic members have concave portions in parts of upper and bottom surfaces of the ferromagnetic members, so that the pair of the ferromagnetic members are disposed in opposition and separated by a predetermined gap. Alternatively, it may be so configured that the pair of the ferromagnetic members each having the U-shaped sectional shape and being extended in the longitudinal direction are disposed in opposition and separated by the predetermined gap (gap) and are fixed to each other by a support member not illustrated. It may be so configured that the stack of the superconducting tape wires 100 at the connecting portion 201 in FIG. 14 as well is surrounded by the ferromagnetic member 210 in FIG. 15. Current directions of the superconducting tape wires 100 to be stacked are alternately set to be reversed.

Figure 16:
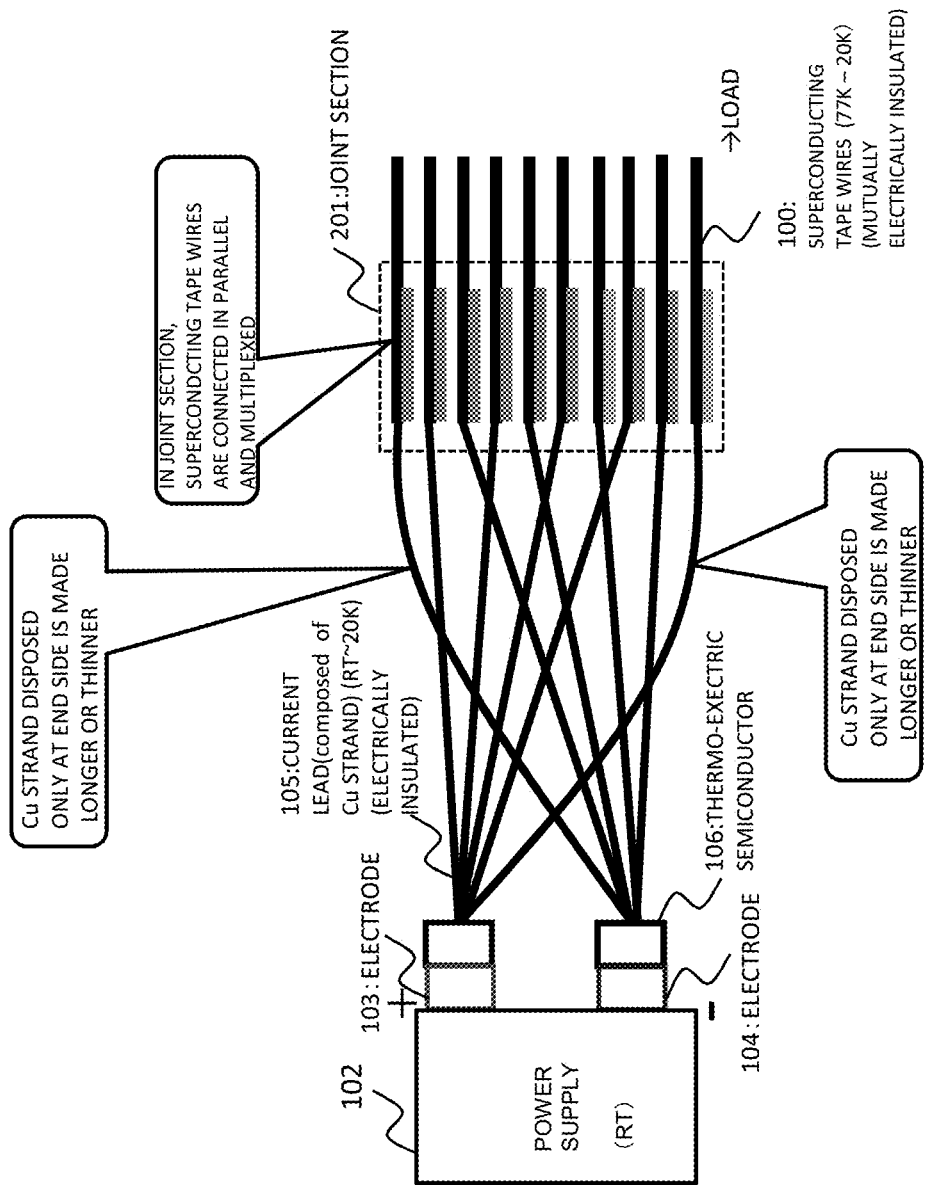
FIG. 16 is a diagram illustrating a variation example of the example embodiment (in FIG. 5).

FIG. 16 is a diagram illustrating another variation example of the example embodiment of the present invention. FIG. 16 is a variation example of the configuration illustrated in FIG. 14. As illustrated in FIG. 16, electric resistances of the current leads that are connected to the superconducting tape wires 100 at end portions (the upper and lower ends in FIG. 15) of the stack conductor of the superconducting tape wires 100 illustrated in FIG. 15 are increased. To take an example, lengths of the current leads (copper wires) 105 that are connected to the upper and lower ends of the superconducting tape wires 100 in FIG. 15 are increased, or thicknesses of the copper wires are reduced.

This can contribute to reduction of a current drift in the stack of the superconducting tape wires 100. When power is supplied to the superconducting tape wires 100 (cable of the stack conductor) that are stacked, an imbalance may be produced in magnetic coupling between the superconducting tape wires 100 that are stacked. Consequently, current does not uniformly flow in the cable of the stack conductor, so that a current density increase may occur (a current drift may occur) in the vicinity of the end portions (of the upper and low ends) of the sections (in FIG. 15) orthogonal to the longitudinal direction of the stack structure, for example.

Then, by increasing the lengths of the current leads (copper wires) or reducing the thicknesses of the copper wires that are connected to the upper and lower ends of the superconducting tape wires 100 in FIG. 15, the increase of current density in the end portions (the upper and lower ends) of the superconducting tape wires 100 is suppressed. It may be so arranged that the lengths and so on of the current leads (copper wires) 105 at the end portions are adjusted by computer simulation and a calibration procedure or the like after installation of the superconducting tape wires 100 (cable of the stack conductor). The current leads (copper wires) whose resistance values are to be adjusted are not limited to the end portions of the current leads (copper wires), and resistance values of the current leads (copper wires) in the vicinity of the end portions, for example, may be further adjusted.

Figure 17:
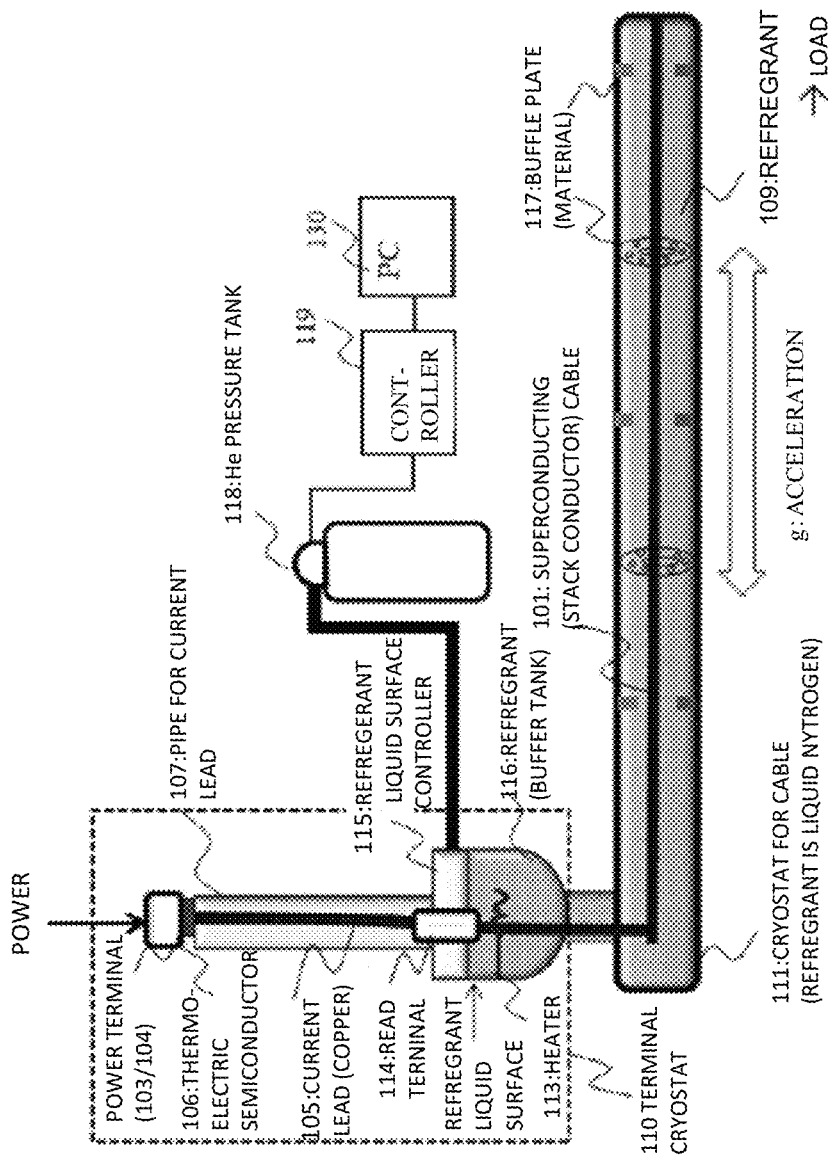
FIG. 17 is a diagram illustrating a variation example of the example embodiment (in FIG. 6).

FIG. 17 is a diagram illustrating further another variation example of the example embodiment of the present invention. FIG. 17 illustrates a variation example of the configuration illustrated in FIG. 16. Referring to FIG. 17, the current leads 105 may be configured to be a portion of the current leads 105 in each of FIG. 14 and FIG. 16. The superconducting cable 101 includes the cable of the stack conductor in the example embodiment described above.

In the example in FIG. 17, a refrigerant buffer tank 116 is disposed in the vicinity of the current leads 105 on the side of the superconducting cable, and an amount of the refrigerant 109 to be supplied to the cable cryostat 111 is adjusted so that a state is maintained where the refrigerant is constantly filled in the cable cryostat 111 (surrounding the inner pipes 121 of the thermally insulated double pipes 120A and 120B in each of FIG. 8C, FIG. 9A, or FIG. 9B). The refrigerant buffer tank 116 includes a refrigerant liquid surface controller 115 to control a liquid surface of the refrigerant in the refrigerant buffer tank 116.

The refrigerant liquid surface controller 115 includes a liquid surface sensor (not illustrated), a first valve (not illustrated) capable of controlling an amount of the refrigerant gas flowing into the refrigerant buffer tank 116, a second valve (not illustrated) that is capable of controlling an amount of the refrigerant gas flowing out from the refrigerant buffer tank 116 and that is provided on an exit side of the refrigerant buffer tank 116, and control means (not illustrated) for controlling opening degrees of the first and second valves. A heater 113 in the refrigerant buffer tank 116 heats the refrigerant (such as the liquid hydrogen) in the refrigerant buffer tank 116 to generate a refrigerant gas (hydrogen gas).

A controller 119 controls the refrigerant from a He pressure tank 118 (accumulator), based on setting of a PC (Personal Computer) 130. Based on the setting of the PC 130, the controller 119 supplies, to the refrigerant liquid surface controller 115, the refrigerant (gas) from the He pressure tank 118 (accumulator), which has been pressurized. The He pressure tank 118 (accumulator) includes a diaphragm (not illustrated) inside the tank, and the diaphragm accommodates He gas and so on. A pump (not illustrated) operates to cause an operation liquid to enter a pipe and pushes up the diaphragm, thereby pressure made stored pressure in a compressed He gas. After the pump is stopped, the compressed He gas pushes out the operation liquid and so on (refrigerant) in the pipe by using the diaphragm.

When the liquid surface of the refrigerant in the refrigerant buffer tank 116 obtained by the liquid surface sensor (not illustrated) falls lower than a predefined set value, the refrigerant liquid surface controller 115 adjusts an opening degree of the second valve (not illustrated) to reduce the pressure so that the liquid surface of the refrigerant rises, for example. When the liquid surface of the refrigerant in the refrigerant buffer tank 116 rises higher than the set value, the refrigerant liquid surface controller 115 adjusts an opening degree of the first valve (not illustrated) to increase the pressure, thereby lowering the liquid surface of the refrigerant, for example. Therefore, a variation in the liquid surface of the refrigerant due to an acceleration when an aircraft takes off or lands, for example, can be reduced.

Still another variation example of the example embodiment of the present invention will be described. A plurality of baffle plates (members) 117 for obstructing a flow of the refrigerant 109 are, for example, disposed in the cable cryostat 111 (i.e., the inner pipes 121 of the thermally insulated double pipes) so that the refrigerant liquid surface of the refrigerant 109 in the cable cryostat 111 (i.e., the inner pipes 121 of the thermally insulated double pipes 120A and 120B in each of FIG. 8C, FIG. 9A, and FIG. 9B) does not greatly vary due to acceleration when an aircraft takes off, lands, or the like, thereby restricting movement of the refrigerant 109 due to a variation of the acceleration (indicated by g in FIG. 17). A baffle plate (member) 117 may be, as a matter of course, disposed in the refrigerant buffer tank 116. The flow of the refrigerant 109 is controlled by the baffle plates 117 so that the refrigerant 109 in the cable cryostat 111 (i.e., the inner pipes 121 of the thermally insulated double pipes 120A and 120B in each of FIG. 8C, FIG. 9A, and FIG. 9B) moves forward, backward, rightward, or leftward, and the superconducting cable 101 is constantly impregnated in the refrigerant 109. The shape of the baffle plate (member) 117 is not limited to a plate and may be a spiral type or the like.

Figure 18:
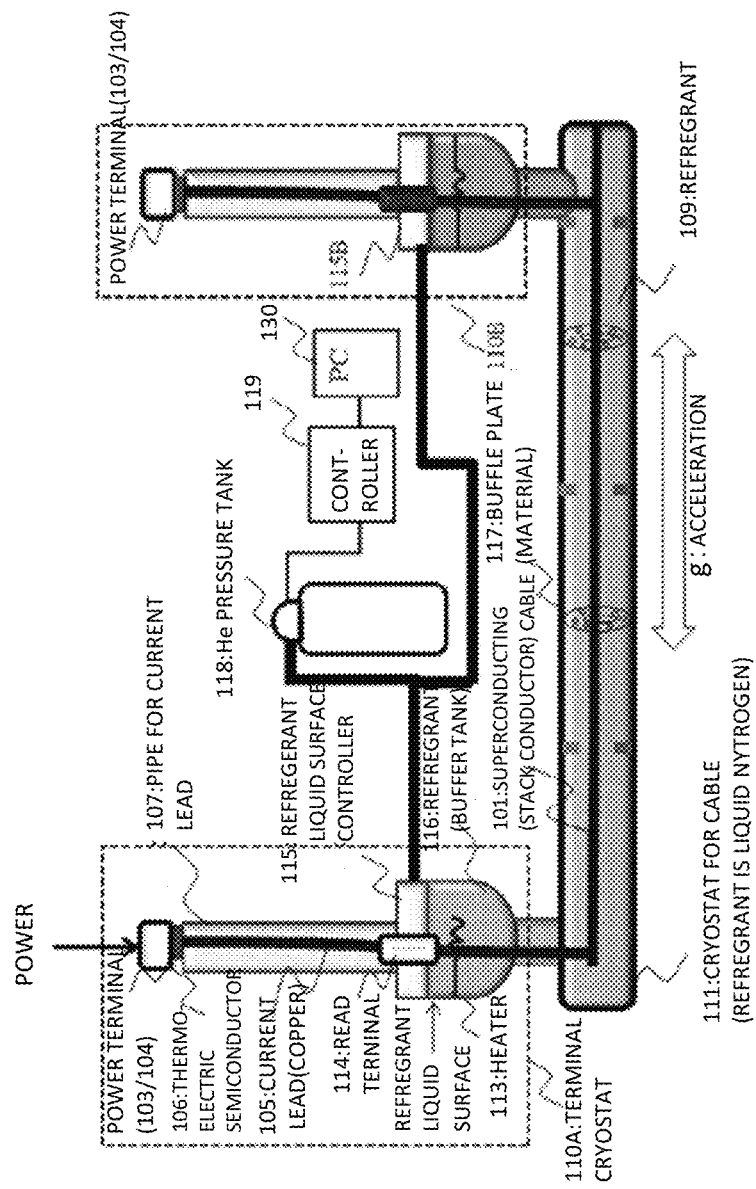
FIG. 18 is a diagram illustrating a variation example of the example embodiment (in FIG. 6).

FIG. 18 is a diagram illustrating a variation example of FIG. 17. The He pressure tank 118 supplies the pressurized refrigerant (gas: e.g., the liquid hydrogen) to each of refrigerant liquid controllers 115A and 115B of plural terminal cryostats 110A and 110B. It is so arranged that opening and closing and opening degrees of first and second valves of each of the refrigerant liquid surface controllers 115A and 115B are controlled based on settings of the PC 130 and the controller 119, thereby preventing the liquid surface of the refrigerant in the refrigerant buffer tank 116 from greatly varying due to acceleration when the aircraft takes off, lands, or the like, for example. To take an example, opening and closing and opening degrees of the first and second valves of each of the refrigerant liquid surface controllers 115A and 115B are controlled to perform pressurization in the refrigerant buffer tank 116, thereby controlling rise of the liquid surface of the refrigerant when the aircraft takes off, lands, or the like. It may be so arranged that the PC 130 mounted on the aircraft is communication connected to a controller configured to manage a flight (operation) state of the aircraft and controls the controller 119 based on the operation state of the aircraft.

Each disclosure of the above-listed Patent Literatures 1 and 2 and the above-listed Non Patent Literatures 1 and 2 is incorporated herein by reference. Modification and adjustment of each example embodiment and each example are possible within the scope of the overall disclosure (including the claims) of the present invention and based on the basic technical concept of the present invention. Various combinations and selections of various disclosed elements (including each element of each claim, each element of each example, each element of each drawing, and the like) are possible within the scope of the claims of the present invention. That is, the present invention naturally includes various variations and modifications that could be made by those skilled in the art according to the overall disclosure including the claims and the technical concept.

What is claimed is:

1. A superconducting cable installation method comprising:
   when bending a superconducting cable of a stacked structure in which a plurality of layers of tape wires are stacked, to a direction not easy to bend at a bending portion of the superconducting cable, the superconducting cable of the stacked structure having directional anisotropy of bendability with a first direction easy to bend perpendicular to a stacking surface of the tape wires and a second direction difficult to bend parallel to the stacking surface of the tape wires,
   twisting the superconducting cable at a portion located, immediately before the bending portion of the superconducting cable in the direction not easy to bend; and
   bending the superconducting cable subjected to the twisting at the portion located immediately before the bending portion to the direction not easy to bend at the bending portion.

2. The superconducting cable installation method according to claim 1, wherein the method comprises:
   when bending the superconducting cable in a direction in which superconducting cable is difficult to bend, performing the twisting process for the superconducting cable immediately before the bending portion, and bending the superconducting cable at the bending portion; and
   twisting the superconducting cable in an opposite direction, when twisting the superconducting cable subsequently.

3. The superconducting cable installation method according to claim 1, comprising:
   causing a straight line portion of the superconducting cable to be housed in a straight-pipe thermally insulated double pipe including an inner pipe and an outer pipe surrounding the inner pipe with a space between the inner pipe and the outer pipe made vacuum; and
   causing the bending portion of the superconducting cable to be housed in a bellows pipe that is connected to a straight pipe end portion of the thermally insulated double pipe.

4. The superconducting cable installation method according to claim 3, wherein
   the outer pipe includes a lithium-magnesium alloy, and
   the inner pipe includes a stainless pipe or a lithium-magnesium alloy.

5. The superconducting cable installation method according to claim 4, wherein an outer surface of the outer pipe is covered with an electric insulation layer.

6. The superconducting cable installation method according to claim 3, wherein the inner pipes are connected by a stainless O ring.

7. The superconducting cable installation method according to claim 1, wherein
a fuel cell is used as a power supply, and electrodes on a room temperature side and the tape wires are connected via current leads, and
the superconducting cable is cooled by liquid hydrogen or liquid nitrogen.

8. A superconducting cable apparatus including:
a superconducting cable of a stack conductor in which a plurality of layers of tape wires are stacked, the superconducting cable of the stacked structure having directional anisotropy of bendability with a first direction easy to bend perpendicular to a stacking surface of the tape wires and a second direction difficult to bend parallel to the stacking surface of the tape wires,
wherein the superconducting cable is twisted at a portion located immediately before a bending portion of the superconducting cable at which the superconducting cable is to be bent to a direction not easy to bend, in the direction not easy to bend, and
wherein the superconducting cable twisted at the portion located immediately before the bending portion is bent to the direction not easy to bend at the bending portion.

9. The superconducting cable apparatus according to claim 8, wherein
a straight line portion of the superconducting cable is housed in a straight-pipe thermally insulated double pipe including an inner pipe and an outer pipe surrounding the inner pipe with a space between the inner pipe and the outer pipe made vacuum, and
the bending portion of the superconducting cable is housed in a bellows pipe that is connected to a straight pipe end portion of the thermally insulated double pipe.

10. The superconducting cable apparatus according to claim 8, wherein
current leads that are conductor wires configured to be connected from a room temperature portion to a low temperature portion are electrically insulated and are respectively connected to the tape wires that are stacked, and
the connection is further made so that a current direction of each of the tape wires is reversed for each layer.

11. The superconducting cable apparatus according to claim 8, wherein thermoelectric semiconductors are attached to the current leads on a room temperature side to transport Peltier heat from a room temperature side to a low temperature side.

12. The superconducting cable apparatus according to claim 8, wherein by using low-temperature gas that gets gasified by entry of heat into a refrigerant for cooling the superconducting cable, performing cooling and temperature control of a heat generation portion of a power converter of a fuel cell or the like.

13. The superconducting cable apparatus according to claim 8, wherein a stainless pipe forming the inner pipe of the thermally insulated double pipe is configured to absorb heat contraction partially by using a bellows pipe.

14. The superconducting cable apparatus according to claim 8, wherein
at a connection portion between a plurality of the tape wires and a plurality of current leads each having one end connected to a power supply part at a room temperature,
the plurality of the tape wires electrically insulated to one another, disposed in parallel, and multiplexed.

15. The superconducting cable apparatus according to claim 14, comprising a ferromagnetic member for both side surfaces of a cable of a stack conductor wherein a plurality of layers of tape wires are stacked, in a longitudinal direction of the cable of the stack conductor.

16. The superconducting cable apparatus according to claim 14, wherein resistance values of current leads at least end portions thereof are set to be different from resistance values of other current leads.

* * * * *